July 6, 1926.
J. C. STIMSON
1,591,572
PROCESS AND APPARATUS FOR MAKING CENTRAL TRIPLE REFLECTORS
Filed Feb. 5, 1925    2 Sheets-Sheet 1
Fig.1.
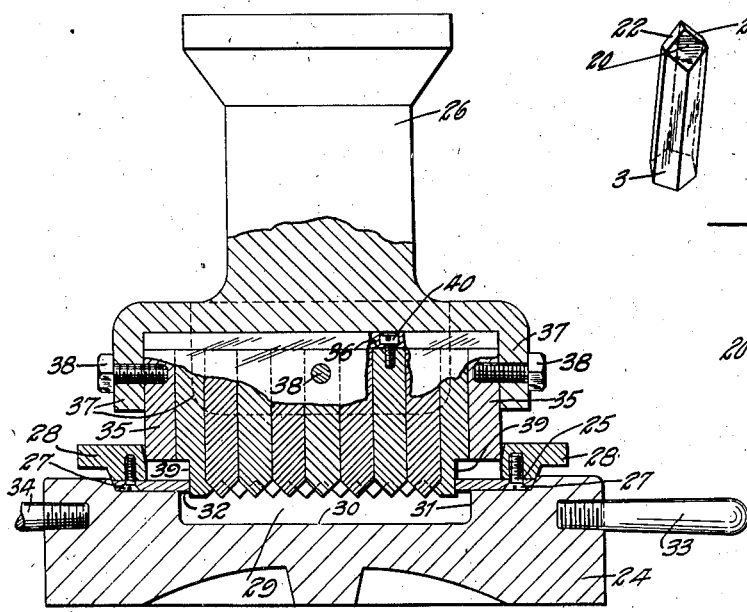
Fig.3.
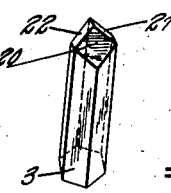
Fig.4.
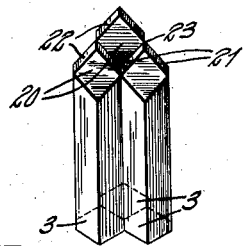
Fig.2.
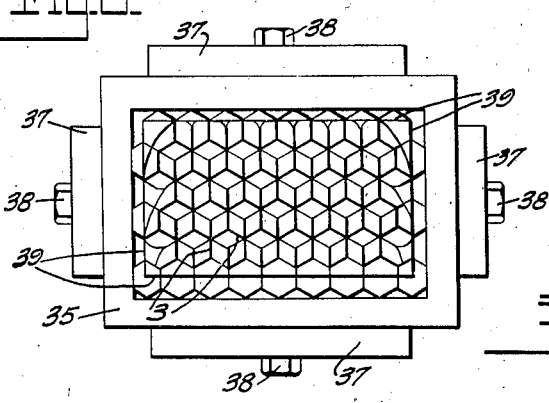
Fig.6. Fig.5.
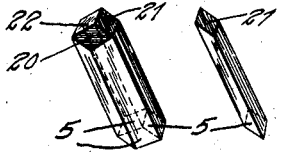
Fig.9. Fig.10.
Fig.7.
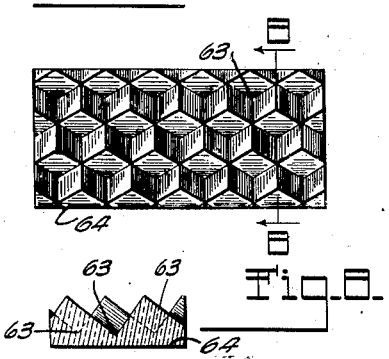
Fig.11.
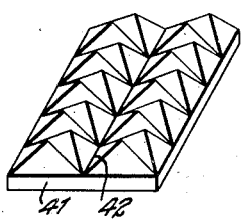
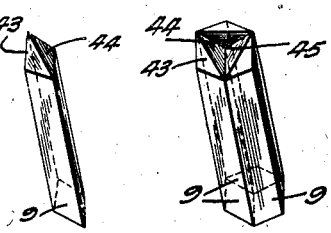
Fig.8.
Inventor.
Jonathan C. Stimson.
by John N. Brunning
Attorney July 6, 1926.
J. C. STIMSON
1,591,572
PROCESS AND APPARATUS FOR MAKING CENTRAL TRIPLE REFLECTORS
Filed Feb. 5, 1925　　2 Sheets-Sheet 2
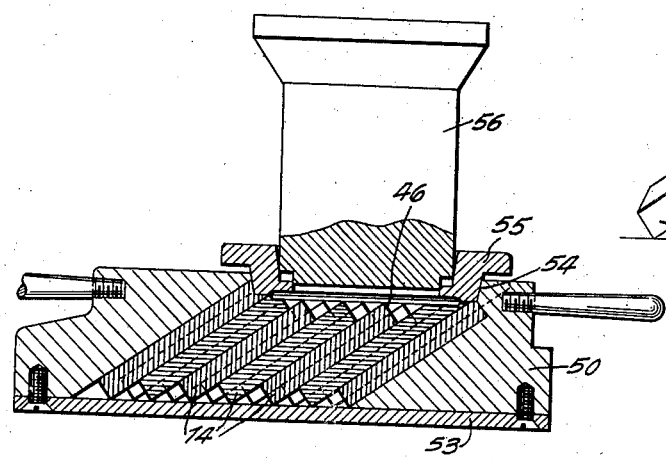
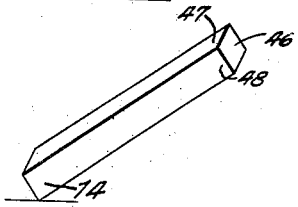
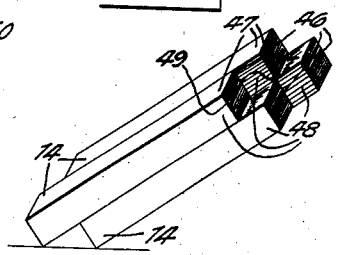
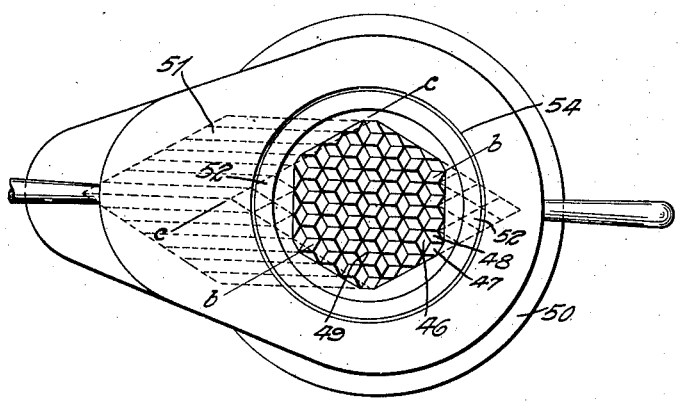
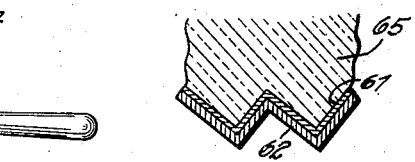
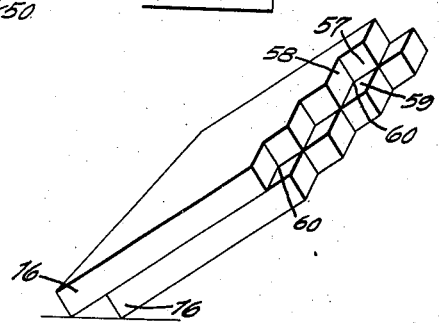
Inventor.
JONATHAN C. STIMSON.
Attorney.

Patented July 6, 1926.

1,591,572

UNITED STATES PATENT OFFICE.

JONATHAN C. STIMSON, OF ST. LOUIS, MISSOURI.

PROCESS AND APPARATUS FOR MAKING CENTRAL TRIPLE REFLECTORS.

Application filed February 5, 1925. Serial No. 7,184.

This invention relates to molding and more particularly to process and apparatus for making central triple reflectors.

Proven physical conceptions often have practical uses of great commercial importance, but have fallen short of full commercial utilization because of the prohibitive cost of quantity reproduction, although actual operability may have been realized, or partially realized by expensive production methods.

In the art of producing reflectors this is particularly true. The conceptions are based upon exact laws and reduction to practice can be carried to marvelous degrees of accuracy through painstaking care where the necessary expense is justified as, for instance, in the production of optical instruments. Occasionally there occurs a conception of a reflector which, while it has certain limited application in instruments built with precision, appears to have uses of much greater commercial importance if production were possible in very large quantity.

Such a conception is the reflector system designated a triple reflector, which consists of three plane mirrors intersecting at a common point; and more especially the central reflector which is a triple reflector whose reflecting surfaces are all three at right angles to each other and whose true form is the three sides of a cube. This reflector has the property of reflecting light impinging from exterior sources and varying inclinations from surface to surface about the axis or center of the reflector and back to, or closely adjacent to the source, in lines parallel to the original rays. The theoretical commercial importance of this reflector in various forms of signalling has long been known, but its actual use has not been widespread; a fact easily understood when it is realized that the central reflector is much more difficult to produce with the same comparative degree of accuracy than many of the reflector systems used generally in the production of scientific optical instruments. This is apparent when it is realized that a slight angular deviation of one of the surfaces results in a multiplied deviation of an impinging ray as it is successively reflected by the other two surfaces. In addition, and perhaps more important, the central reflector, if produced in its theoretical form would not have the value thought to be attached to it for the more important forms of signalling work, but in order to have that value the reflector system must be definitely modified. This modified central reflector, whose surfaces and angles are so formed as to result in a cone of reflected light having the reflector as the apex, is the subject of another application for patent Serial Number 650,402, filed July 9, 1923, and is referred to here only to make clear that the present invention is for a reflector, process and apparatus pertaining to the modified central reflector which is referred to herein and in other applications for patent as central triple reflector.

Another form of triple reflector is one in which the interior trihedral solid angle formed by the three surfaces is filled up with some transparent material, such as glass. This type of reflector is referred to as a solid central triple reflector.

In making a plane surface for use as a reflector it is obvious that machining, grinding and polishing or some equivalent process must be employed. To make a solid central triple reflector this process must be repeated for each of the three surfaces, which must all be surfaced in accurate angular relation. It is commercially impracticable to so treat each of the surfaces; this is especially true where the reflector comprises a series of central triple reflecting units arranged in mutual relation to form the reflecting face.

One of the objects of this invention, therefore, is to provide a process whereby the reflecting surfaces are formed by a matrix.

The use of a matrix, however, requires careful surfacing so that the surfaces of the reflectors can be formed accurately thereby. But the surfaces of the matrix of a solid central triple reflector form an interior trihedral angle. Such an interior angle cannot be accurately or readily formed, as the usual most accurate and cheapest methods for surfacing plane surfaces apply only to surfaces which are not in such relation as to form interior solid angles with adjacent surfaces.

Another object of this invention, therefore, is to provide a method of producing matrices for solid central triple reflectors the surfaces of which may be accurately and readily formed.

To make them more practical, commercially, it is desirable to produce reflectors which comprise close contiguous grouping of a series of small triple reflecting units into an integral plate. The same necessity for a method for originally producing and maintaining each one of the multiplicity of surfaces with accurate plane and polish, obtains as with the production of single units, the problem becoming more involved because of the complexity of surfaces in such a multiple unit reflector. To produce and maintain a matrix for solid multiple unit reflector plates from a block of material, the surfaces taking the form of pits in the matrix, is very expensive if not impossible. Also to surface and polish a matrix for reproducing multiple unit reflectors of hollow type from a block of material is almost as difficult.

Another object of this invention, therefore, is to provide a method of and apparatus for forming multiple unit central triple reflectors on matrices that are formed with proper accuracy by usual surfacing methods without the complications arising from forming the same surfaces in solid assembly.

In accordance with one of the features of this invention, matrices are formed by means of cooperable elements arranged in mutual engagement.

Another object of this invention is to provide a matrix with the smallest possible number of elements.

Further objects will appear from the detailed description taken in connection with the accompanying drawings, in which:—

Figure 1 is a longitudinal vertical section of an apparatus embodying this invention;

Figure 2 is a face view showing the matrix;

Figure 3 is a perspective of one of the matrix forming elements of Figure 1;

Figure 4 is a perspective of three of the elements of Fig. 3 grouped in assembled relation;

Figure 5 is a perspective of another form of matrix forming element;

Figure 6 is a perspective of three of the elements of Figure 5 in assembled relation;

Figure 7 is a face view of the figured face of a reflector produced by the apparatus of Figures 1 and 2;

Figure 8 is a section on line 8—8, Figure 7;

Figure 9 is a perspective of still another form of reflector forming element;

Figure 10 is a perspective of three of the elements of Figure 9 grouped in assembled relation;

Figure 11 is a perspective of the reflector produced by an assembly of elements of Figure 10;

Figure 12 is a view similar to Figure 1 but showing another apparatus embodying this invention;

Figure 13 is a face view showing the matrix;

Figure 14 is a perspective of one of the reflector forming elements of the apparatus Figure 12;

Figure 15 is a perspective of four of the elements of Figure 14 in assembled relation;

Figure 16 is a perspective showing two assembled elements of another embodiment, which may be used in the apparatus of Figures 12 and 13.

Figure 17 is a sectional view of a matrix and hollow type multiple unit central triple reflector.

Referring first to Figures 7 and 8 which are views of a pressed glass multiple unit reflector as more fully described and claimed in application Serial Number 92,024, filed March 3, 1926. It will be seen that this reflecting structure consists of a series of cube like formations which are not the diagonal corners of cubes, but exist in an integral plate, with each reflector unit consisting of the three full sides of a cube. This central triple reflector plate is produced by the apparatus, Figures. 1, 2, 3, 4.

Figure 3 shows at 3 one of the cooperable elements, a series of which are to be grouped in assembled relation to form the reflector forming matrix, Figure 2, into which the glass is pressed. This element has a cross section which is a regular hexagon, corresponding in dimensions to the apertures of the unit reflectors to be formed, which, upon inspection of Figure 7 are seen to have hexagonal apertures. The element or hexagonal bar is made of convenient length and at one end is pointed by cutting three plane surfaces 20, 21 and 22 perpendicular to the planes passing through the three diagonals of the bar, these three cuts being made at an angle of substantially 35 degrees and 16 minutes to the axis of the bar. The three surfaces 20, 21 and 22 formed in this manner are the three adjacent faces of a cube.

In producing these elements cold drawn hexagonal steel rod, properly alloyed to resist heat, is sufficiently accurate for use, and the surfacing may be done with ordinary machine tools and lapped or polished by hand. With care the desired degree of accuracy can be maintained, and since there are no interior solid angles formed by the three surfaces the hand or machine polishing can be done easily and without distorting the surfaces.

In Figure 4 three of the elements 3 are placed in assembled relation, with the cube surfaces 20, 21 and 22 of the grouped elements similarly oriented, the three adjacent surfaces of the three adjacent elements forming the pocket or trihedral angle 23, which upon inspection will be seen to be complementary to each of the exterior trihedral angles of the elements. The depression 23, therefore, is also cube-like, with the surfaces of three adjacent faces of a cube, and thus is formed with machine precision and economy the matrix or mold for one of the triple reflecting units 63 of the multiple unit reflector 64 Figure 7.

Additional elements placed in similar assembled relation produce the complete matrix of the reflector to be formed, the only portions of the elements exposed being the square, angularly cut surfaces. Since each element has three of these surfaces, it follows that each of these three surfaces becomes one of the surfaces of three adjacent depressions or matrices. Disregarding the outer edge of the reflector, it follows that there are the same number of mold elements required as there are triple reflecting units to be formed, thus minimizing the number of elements required.

The apparatus, Figure 1, consists of three working parts; the mold 24, the ring 25 and the plunger 26. The plunger is gripped about the tapered collar by the yoke of a vertical slide of any type of press machine commonly known in the art, and is moved vertically upward and downward to pass through a ring. The ring is in this case made of two parts comprising a flat steel plate 27 screwed to a casting 28. The mold 24 is usually a casting, in which is formed the depression, 29 which is the receptacle for the molten glass placed therein and formed by pressure upon the plunger 26, working through the ring 25. The depression 29 in the mold has a face 30 forming the smooth face of the reflector, and the outer wall of an upstanding glass collar on the reflector is formed by surface 31. The ring forms at 32 the top edge of the upstanding collar, while the inner wall of this collar is formed by the plunger edge which makes a glass tight fit with and passes down through the ring. The reflecting surfaces of the reflector are formed by the face or matrix of the plunger. For clearness in illustration the plunger is not shown in its fully lowered position, but it is to be understood that in squeezing the glass into shape the plunger is further lowered with pressure upon the glass.

The operation begins with the plunger drawn up out of the way, and with the ring in position in the mold. Molten glass of the desired mass is placed in the receptacle 29 and the mold is pushed across the face of the press machine table until it engages with stops which line the ring up with the plunger. The plunger is then lowered through the ring and the glass squeezed into form. The pressure is maintained until the glass has set sufficiently to retain its multisurface shape without slumping or distorting of these surfaces materially. By properly regulating the comparative temperatures of the plunger and mold, and by skillful handling, the shrinkage of the glass in cooling can be centralized to a degree upon either the smooth or figured face of the reflector. This is important in securing the most efficient reflectors for varying purposes.

The plunger is next raised, the ring removed from the mold, and the mold turned over by means of the pivoting lug 33 and handle 34 and the glass reflector drops out and is placed in the annealing oven.

The plunger 26 varies from the usual glass making equipment in that the entire glass forming face and body part of the plunger consists of the assembled hexagonal elements 3. A box like frame 35 with a removable bottom 36 forms a container for the assembled elements. The part 35 is fitted to the plunger shank 26, which is formed with four parts 37 into which the box 35 is placed and held by the cap screws 38.

The elements 13 are assembled within the box 35, the heavily outlined hexagons representing the elements 3, and light lines representing the dihedral angles formed by the intersections of the surfaces 20, 21 and 22 of the cooperating elements. The outer rows of hexagonal elements along the sides of the box 35 are not surfaced with the three faces 20, 21, 22, but the elements of the bottom row (Figure 2) are given only one angularly cut face and those of the top row two angularly cut faces. The elements of outer staggered rows at the ends of the box are similarly angularly cut on only one or two faces. The four peripheral rows of elements are then machined off perpendicular with respect to the plane of the mold face, or with a desired amount of taper along the lines 39, giving a plunger face which fits and slides through the ring 25, this face entirely composed of elements assembled in close engagement. The elements are held in position within the box by means of the screws 40 (Figure 1) countersunk in the plate 36. As the angular faces of the elements form reflector producing molds or matrices which are adjacent to the elements themselves in that each matrix is surrounded by three elements, it is seen by inspection of Figure 2 that the outer marginal elements cooperate with adjacent elements to form the matrices of complete reflector units up to the edge of the reflector, which is in this case edged by an upstanding glass collar. Actually some of the outside reflectors are not complete, but have their apertures reduced somewhat by curved lines, formed on the elements as shown in Figure 2 by rounding off the sharp corners of the outer elements to reduce what is known in the art as pressure cracking.

It is plain from the foregoing description that the apparatus according to Figures 1, 2, 3 and 4 is workable and may be produced in its entirety with the usual machine tools. It is also plain that the reflector forming face when assembled is far superior in accuracy than could be secured by chiseling or cutting out the figure by hand from a solid block of material. Even though theoretically such a solid matrix could be produced, the accuracy and polish could not be maintained in production. In use the molds are subjected to high temperatures and oxidize, a scale forming on the surfaces which must be removed frequently. This is usually done by applying fine abrasives upon the surfaces by hand, and when repeated a few times the surfaces, in spite of great care, become warped and out of accurate angular relation. In accordance with this invention the box 35 may be easily removed from the plunger shank 37, and the assembled elements removed by taking out the screws 40. The elements may then be polished with ease and accuracy by lapping upon a flat lead lap or fine polishing stone. This process may be repeated a number of times before the surfaces become seriously distorted or off angle. Then the elements may be completely resurfaced by machine, a similar amount being removed from the surfaces of each element in order to keep them the same length. The process may be repeated many times without making the elements too short for use.

It is not necessary that the elements forming the matrix of the reflector, Figure 7, be hexagonal bars, although this form results in the fewest possible number of parts which contain no surfaces forming interior angles. Instead the matrix may be formed by an assembly of lozenge shaped bars 5, Figure 5, each of which has a cross section having 60 degree and 120 degree angles. This element is to be inserted in perpendicular position as is element 3, and actually is the resolving of the element 3 into three component parts, each one of the parts being surfaced off to form one of the squares 21. This is illustrated in Figure 5 which shows one of the lozenge shaped elements in perspective with its square, angularly cut surface a plane perpendicular to the plane of the longest diagonal of the element, and with this surface lying at an angle of substantially 35 degrees 16 minutes to the axis of the element. Figure 6 shows three elements 5 grouped in assembled relation to form the equivalent of element 3. It follows that the entire matrix assembly with these elements is similar to the hexagonal element assembly already described, with the difference that there are three times the number of elements cooperating to form the glass forming face, but each element has only one face 20.

In the reflector shown in Figure 11, the reflector units are the corners of a cube bounded by the diagonals of the cube, thus having a triangular instead of hexagonal aperture. It will be noted that each of these units is tetrahedral in that they may be conceived as removed from integral contact with the binder 41 and become a tetrahedron. Inspection of the figure shows that this reflector has solid trihedral exterior angles similar to the solid trihedral exterior angles of the reflector, Figure 7, but that the interior solid angles 42, unlike reflector Figure 7, are dihedral angles. It follows that the matrix elements 3 will not assemble in mutual engagement to form the matrix of reflector, Figure 11. Elements, one of which is shown at 9 in Figure 9, may, however, be assembled to form such a matrix.

The element, Figure 9, is cut from a lozenge shaped bar equivalent to the bar from which element 5 is cut and shaped, i. e. in cross section having angles of 60 degrees and 120 degrees. But instead of being cut and surfaced with one face as in Figure 5, two faces are cut on the end of this element. These two faces, 43 and 44 are made intersecting along the longest diagonal of the element, each surface making an angle with the axis of the element of substantially 35 degrees 16 minutes. By grouping three of these elements 9 in mutual engagement the pit or depression 45 is formed, which is the matrix for one of the units of the reflector, Figure 11.

The dihedral angle formed by surfaces 43 and 44 is the complement of the dihedral angle 42 in the reflector. By multiplication of the number of cooperable elements 9 assembled in mutual engagement it follows that a matrix of Figure 11 may be formed, and with the adjustments necessary may be employed to form glass pressing apparatus according to Figures 1 and 2. It is to be noted that since the element 9 contains only two glass forming surfaces, a larger number of elements must be employed than elements 3 to form the same number of reflecting units.

Reverting again to reflectors of the type of Figure 7; Figures 12, 13, 14, 15 and 16 illustrate another type of equipment embodying this invention for the pressing of reflectors.

A square bar 14, Figure 14, with an accurately cut and surfaced square end 46, perpendicular to the axis of the bar, may be employed as the element of the matrix assembly. Four such elements are mutually positioned as shown in Figure 14 with the ends staggered one with the other a distance equal to the thickness of the bar elements.

Two adjacent sides 47 and 48 of the element and the end 46 then become the matrix forming surfaces, adjacent sides and ends of adjacent elements forming pits or depressions 49, which, when the bar elements are assembled on a slant within a glass pressing apparatus produce the matrix of the reflector.

Figures 12 and 13 illustrate such a glass making apparatus. In this case it is chosen that the figured face of the reflector will be formed in the mold and the smooth face by the plunger. Also that the reflector will be round with a hexagonal reflecting aperture. A square hole 51 is machined in the mold casting 50, with the axis or center line of this hole lying at an angle of substantially 35 degrees and 16 minutes with the mold face. The dimensions of the sides of this hole are equal to seven times the thickness of the square bar elements 14, so that 49 of the bars will just fill the hole when assembled therein. The elements 14 which are to form the glass reflecting faces, are made the proper length to reach up to the proper height in the mold casting to form the matrix. These bars are shown in section through their diagonal in Figure 12. All the square bars do not form reflecting surfaces. The ones that do not are indicated by the dotted diamonds 52 in Figure 13. The bars 52 are made longer than elements 14 and inserted simply as fill up material in the hole 51. After the assembly is completed the plate 53 is attached to the mold casting 50, and the circular depression 54, which forms a part of the edge of the reflector and is also a chamber for the ring 55 is machined from the casting and square bars 52 which are not glass forming elements. With the addition of the plunger 56 to fit the ring 54 the apparatus is complete and is operated to produce reflectors in the same way that the apparatus, Figures 1 and 2, is employed.

While it is plain that the elements, Figure 14, are simpler to produce than the elements, Figure 3, elements 14 are not as permanent as elements 3 in continued production. After the surfaces 47 and 48 have been polished a few times they must be trued by surfacing, (grinding) which reduces the size of the bar section and consequently the dimensions of the reflectors formed in the matrix. Such a reduction in size also introduces complication in the fitting of the bars into the hole 51. None of these complications are encountered with the elements 3.

Figure 16 illustrates another form of element and assembly somewhat similar to Figures 14 and 15, a series of elements 14 being integral so as to form plates, for convenience considered to have the same thickness as the square bar element 14. These plates are given accurate saw toothed cuts forming interior and exterior dihedral angles of 90 degrees, and so spaced that the resulting surfaces 57 and 58 are squares. Then by staggering the plates in assembly the same general way that elements 14 are staggered the matrices 60 are formed by the two adjacent cuts 57 and 58 and a portion 59 of a face of the adjacent plate. Seven of these plates may be employed to form the mold assembly, Figure 13; the plates, all the same length, being inserted parallel to two opposite faces of the square hole 15; for instance in this case parallel to the face c—c of the hole 51. In this particular mold only one of the plates, indicated by b—b, Figure 13, would be given the full number of right angled dihedral cuts, the other plates having portions extending into the dotted areas 52 which are machined off to form the body of the mold.

The plate elements of Figure 16 may be accurately formed so far as machining goes, since the dihedral angles formed by surfaces 57 and 58 may be cut through from one side of the plate to the other. Machine surfacing or grinding can also be done with proper equipment, but hand lapping cannot be done with the same facility or nicety of finish possible with the elements of Figures 3, 5, 9, 14 which contain no interior angles. For certain uses, however, a high polish on the reflecting surfaces is not desirable, and the elements of Figure 16 have the advantage of reducing the number of cooperable parts or elements employed.

Figure 17 illustrates a process for making reflectors of the hollow type from a matrix. The upper part of Figure 17 represents the matrix 65. This matrix may either be a pressed glass plate, such as shown in Figures 7 or 11, and formed by a matrix as previously described, or it may be initially formed of matrix elements 3, etc. In the latter case the matrix elements are constructed of any suitable material which will not readily electroplate when immersed in an electrolytic bath, or they may be coated with a medium to secure the same result. The reflector forming surfaces only of the matrix are then coated with a silver or other metallic reflecting film 61, and the whole immersed in an electrolytic bath, where copper 62 is deposited upon the film 61 to form a body for the silvered surfaces. When the copper is built up on the silver in sufficient amount (the copper not adhering to the unsilvered portions of the mould) the laminated silver-copper plate 61—62 is removed or broken loose from the matrix and the process repeated. In this manner a central triple reflector, and more especially a multi-unit one, may be formed with the required accuracy. It is evident from the foregoing that the method embodying this invention is advantageous in producing hollow central triple reflectors.

It will, therefore, be seen that the invention accomplishes its objects. In accordance with this invention, one or more mold or reflector-forming surfaces is or are produced on each of a series of cooperable mold elements. These elements have locating faces while the mold or reflector forming face or faces is or are formed in accurate relation with respect to the locating faces and more particularly with respect to intersecting locating faces. In the particular embodiments the reflector or mold forming surfaces are at the ends of the elements while the locating faces are lateral thereof. The elements are assembled in mutual engagement to fix the reflector forming surfaces of cooperating elements in accurate relation in order to form together a matrix. A matrix is formed by the surfaces on adjacent elements surrounding the matrix, while the locating faces of the elements are in mutual engagement at the bottom thereof. A series of matrices in contiguous relation are formed by the surfaces on the cooperating mold elements. In Figures 5 and 6 each mold element has a single reflector or mold forming surface, while in Figures 9 and 10 each element has two such surfaces. In Figures 3, 4, 14 and 15 each element has three surfaces, while in Figure 16 a series of elements like 14 (Figure 14) are formed into a single element. When the elements are assembled in mutual engagement, the locating surfaces thereon perform the function of accurately positioning the reflector or mold forming surfaces with respect to each other both angularly and depthwise. Since these surfaces are located accurately with respect to intersecting locating faces, they are accurately located with respect to both surfaces on adjacent elements in order to form the required trihedral angle. The reflector material is conformed to the matrix; accordingly surfaces on a reflector forming element conform to the surfaces of adjacent reflecting units in that the reflector surfaces are formed by the element surfaces. The elements are arranged in mutual engagement to form trihedral angles which are congruent, in that their respective dihedral angles are equal, as is necessary to form central triple reflecting surfaces; moreover each element has surfaces which form together a congruent trihedral angle; accordingly the surfaces of three adjacent elements form together a congruent trihedral angle. The formed reflector of Figure 7, while being a reverse or a relief of the matrix, is really similar thereto, in that the form of the elements are the same as the reflector units and their respective trihedral angles are really congruent. Accordingly the number of mold elements need not exceed the number of reflector units, which is advantageous from a manufacturing stand-point.

It is obvious that various changes may be made in details of construction without departing from the spirit of this invention; it is, therefore, to be understood that this invention is not to be limited to the specific details shown and described.

Having thus described the invention, what is claimed is:—

1. In the art of making central triple reflectors, the process comprising, producing a reflector-forming surface on each of a series of cooperable mold elements and in accurate relation with respect to intersecting locating faces thereof, and assembling the elements in mutual engagement to fix the reflector-forming surfaces of cooperating elements in accurate relation to form together a trihedral matrix, substantially as and for the purpose set forth.

2. In the art of making central triple reflectors, the process comprising, producing a series of reflector-forming surfaces on each of a series of cooperable mold elements and in accurate relation with respect to intersecting locating faces thereof, and assembling the elements in mutual engagement to fix the reflector forming surfaces of cooperating elements in accurate relation to form together a series of contiguous trihedral matrices, substantially as and for the purpose set forth.

3. In the art of making central triple reflectors, the process, comprising, producing three reflector-forming surfaces on each of a series of cooperable mold elements and in accurate relation with respect to intersecting locating faces thereof, and assembling the elements in mutual engagement to fix the reflector forming surfaces of cooperating elements in accurate relation to form together a series of contiguous trihedral matrices, substantially as and for the purpose set forth.

4. The process of making molds of the character described, comprising, producing three mutually intersecting forming surfaces on each of a series of cooperable mold elements and in accurate relation with respect to the locating faces thereof, and assembling the elements in mutual engagement to fix the forming surfaces of cooperating elements to form together a series of contiguous matrices.

5. A mold of the character described, comprising, a series of mold elements having locating faces arranged in mutual engagement, each element having three forming surfaces in accurate relation with respect to the locating faces thereof, adapted to form together a series of contiguous matrices, each of which is formed by the surfaces of three elements.

6. A mold of the character described, comprising, a series of mold elements of hexagonal cross-section having locating faces arranged in mutual engagement and having forming surfaces adapted to form together a series of contiguous matrices.

7. A mold of the character described, comprising, a series of mold elements having locating faces arranged in mutual engagement, each element having a forming face in accurate relation with respect to the locating faces thereof and the forming surfaces of adjacent elements forming together a congruent trihedral angle.

8. A mold of the character described, comprising, a series of mold elements having locating faces arranged in mutual engagement, each element having forming surfaces in accurate relation with respect to the locating faces thereof and the forming faces of each set of adjacent elements forming together a congruent trihedral angle.

9. A mold of the character described, comprising, a series of mold elements arranged in mutual engagement, each element having a surface, and the surfaces of three adjacent elements forming together a congruent trihedral angle.

10. A mold of the character described comprising, a series of mold elements arranged in mutual engagement, each element having surfaces, and the surfaces of each three adjacent elements forming a congruent trihedral angle.

11. A mold of the character described comprising, a series of mold elements arranged in mutual engagement, each element having three surfaces, and the three adjacent surfaces of three adjacent elements forming congruent trihedral angles.

12. A mold of the character described comprising, a series of mold elements arranged in mutual engagement, each element having surfaces which form together a congruent trihedral angle, and the three adjacent surfaces of three adjacent elements forming congruent trihedral angles.

13. A mold of the character described comprising, a series of mold elements arranged in mutual engagement, each element being hexagonal in cross section, each element having surfaces which form together a congruent trihedral angle, and the three adjacent surfaces of three adjacent elements forming congruent trihedral angles.

In testimony whereof I affix my signature this 17th day of January, 1925.

JONATHAN C. STIMSON.